(12) United States Patent
Ha et al.

(10) Patent No.: US 10,916,932 B2
(45) Date of Patent: Feb. 9, 2021

(54) PROTECTION OF POWER TRANSFORMERS (71) Applicant: General Electric Technology GmbH, Baden (CH)

(72) Inventors: Hengxu Ha, Stafford (GB); Yu Weng, Stafford (GB); Gajendiran Balakrishnan, Stafford (GB)

(73) Assignee: General Electric Technology GmbH, Baden (CH)

( * ) Notice: Subject to any disclaimer, the term of this patent is extended or adjusted under 35 U.S.C. 154(b) by 363 days.

(21) Appl. No.: 15/767,405

(22) PCT Filed: Oct. 12, 2016

(86) PCT No.: PCT/EP2016/074517
§ 371 (c)(1),
(2) Date: Apr. 11, 2018

(87) PCT Pub. No.: WO2017/064148
PCT Pub. Date: Apr. 20, 2017

(65) Prior Publication Data
US 2018/0294640 A1 Oct. 11, 2018

(30) Foreign Application Priority Data
Oct. 12, 2015 (EP) .................................... 15275215

(51) Int. Cl.
*H02H 7/04* (2006.01)
*H02H 3/08* (2006.01)
*H02H 9/00* (2006.01)

(52) U.S. Cl.
CPC ............... *H02H 7/04* (2013.01); *H02H 3/08* (2013.01); *H02H 9/002* (2013.01)

(58) Field of Classification Search
CPC .. H02H 3/08; H02H 3/10; H02H 7/04; H02H 9/00; H02H 9/002; H02M 7/042
See application file for complete search history.

(56) References Cited

U.S. PATENT DOCUMENTS 3,754,163 A * 8/1973 Sykes .................... H02H 7/045
361/36
4,704,653 A 11/1987 Li
(Continued)

FOREIGN PATENT DOCUMENTS

CA 2 018 938 C 1/2002
JP H09-322379 A 12/1997
WO WO-02093710 A1 * 11/2002 ............. H02H 7/045

OTHER PUBLICATIONS

Extended European Search Report and Opinion issued in connection with corresponding EP Application No. 15275215.0 dated Mar. 30, 2016.
(Continued)

*Primary Examiner* — Matthew V Nguyen
(74) *Attorney, Agent, or Firm* — Eversheds Sutherland (US) LLP (57) ABSTRACT

A method of protecting a power transformer including: monitoring an external fault indication signal; carrying out locally a fault determination; carrying out locally an inrush current determination; and issuing a final trip signal to protect the power transformer if the external fault indication signal identifies that a fault has occurred and the locally carried out fault determination confirms that a fault has occurred; or the external fault indication signal identifies that a fault has occurred and the locally carried out fault determination identifies that no fault has occurred but after a predetermined delay the locally carried out inrush current determination confirms the absence of an inrush current.

7 Claims, 4 Drawing Sheets

(56) References Cited

U.S. PATENT DOCUMENTS

| | | | |
|---|---|---|---|
| 6,483,680 B1 | 11/2002 | Kulidjian et al. | |
| 2010/0026276 A1 | 2/2010 | Wunderlich et al. | |
| 2010/0208403 A1* | 8/2010 | Das | G01R 19/2513 |
| | | | 361/94 |
| 2015/0204918 A1* | 7/2015 | Chen | G01R 25/00 |
| | | | 702/64 |
| 2015/0349511 A1* | 12/2015 | Kojovic | H02H 3/28 |
| | | | 361/36 |

OTHER PUBLICATIONS

International Search Report and Written Opinion issued in connection with corresponding PCT Application No. PCT/EP2016/074517 dated Jan. 17, 2017.

International Preliminary Report on Patentability issued in connection with corresponding PCT Application No. PCT/EP2016/074517 dated Apr. 17, 2018.

* cited by examiner

PROTECTION OF POWER TRANSFORMERS

FIELD OF INVENTION

Embodiments of the invention relate to a method of protecting a power transformer.

BACKGROUND

When a power transformer is first energized a large inrush current, typically 10 to 15 times larger than the rated transformer current, tends to flow for nearly 1 second. Such a large flow of current can look to an external protection scheme, e.g. a differential protection scheme, like a fault current and thereby cause the external protection scheme to erroneously operate an associated protection device, such as a protective circuit breaker. Such mal-operation of the protection device is undesirable since it prevents energizing of the power transformer and subsequent use of the power transformer, e.g. in an electrical power network.

BRIEF DESCRIPTION OF THE INVENTION

According to an aspect of embodiments of the invention there is provided a method of protecting a power transformer comprising:
monitoring an external fault indication signal;
carrying out locally a fault determination;
carrying out locally an inrush current determination; and
issuing a final trip signal to protect the power transformer if:
the external fault indication signal identifies that a fault has occurred and the locally carried out fault determination confirms that a fault has occurred; or
the external fault indication signal identifies that a fault has occurred and the locally carried out fault determination identifies that no fault has occurred but after a predetermined delay the locally carried out inrush current determination confirms the absence of an inrush current.

Having the method of embodiments of the invention issue a final trip signal to protect the power transformer, e.g. cause the operation of a protective circuit breaker or other protection device, as soon as the locally carried out fault determination confirms that a conventional fault has occurred avoids any delay in issuing such a final trip signal, such as might otherwise arise in attempting to distinguish between a fault current and an inrush current, and so helps to ensure that the power transformer is immediately protected from a large fault current that might damage it.

Meanwhile, the ability of the method of embodiments of the invention to also issue a final trip signal only when the locally carried out inrush current determination confirms the absence of an inrush current allows the method to similarly protect the power transformer in particular situations where the fault cannot be identified by the locally carried out fault determination, e.g. when the fault is a zero-point-on-wave fault.

Moreover, this latter functionality is able quickly to establish the presence of an inrush current, and so helps to avoid the incorrect issuing of a final trip signal (and consequential mal-operation of an associated protection device) during initial energizing of a power transformer when a large inrush current would normally flow.

It follows that the method of embodiments of the invention is for the vast majority of the time, i.e. when a conventional fault occurs, able immediately to protect a power transformer, while also being able on occurrence of far less frequent particular faults, e.g. zero-point-on-wave faults, to distinguish between such a fault and an inrush current and so correctly initiate protection of the power transformer when necessary while avoiding mal-operation of associated protection devices, e.g. when the power transformer is initially energizing.

In an embodiment, the step of carrying out locally a fault determination includes comparing different frequency components of a measured current of the power transformer.

Optionally comparing different frequency components of a measured current of the power transformer includes:
extracting components of first and second frequency bands of the measured current;
determining the amplitude of the first and second frequency band components;
comparing a ratio of the amplitudes to a fault determination value; and
confirming a fault has occurred when the ratio differs from the fault determination value.

Carrying out the foregoing steps provides a quick and reliable means of checking locally whether a fault has occurred.

The step of carrying out locally an inrush current determination may include comparing a harmonic current of the power transformer with a fundamental current of the power transformer.

In embodiments of the invention comparing a harmonic current of the power transformer with a fundamental current of the power transformer includes:
obtaining a $2^{nd}$ harmonic frequency component and a fundamental frequency component of a measured current of the power transformer;
determining the magnitude of the $2^{nd}$ harmonic and fundamental frequency components;
comparing a ratio of the magnitudes to an inrush current determination value; and
identifying the presence of an inrush current when the ratio differs from the inrush current determination value.

Optionally obtaining a $2^{nd}$ harmonic frequency component of a measured current of the power transformer and determining the magnitude of the $2^{nd}$ harmonic frequency component includes the convolution of the measured current with complex coefficients, wherein the complex coefficients are established by a predetermined parameter matrix based on a sampling regime used to measure the current of the power transformer.

In an embodiment, the magnitude of the fundamental frequency component is determined using a half-cycle Fourier method.

The foregoing steps allow the presence of an inrush current to be checked locally as quickly as possible.

BRIEF DESCRIPTION OF THE DRAWINGS

There now follows a brief description of preferred embodiments of the invention, by way on non-limiting example, with reference to the following figures in which.

DETAILED DESCRIPTION

Figure 1:
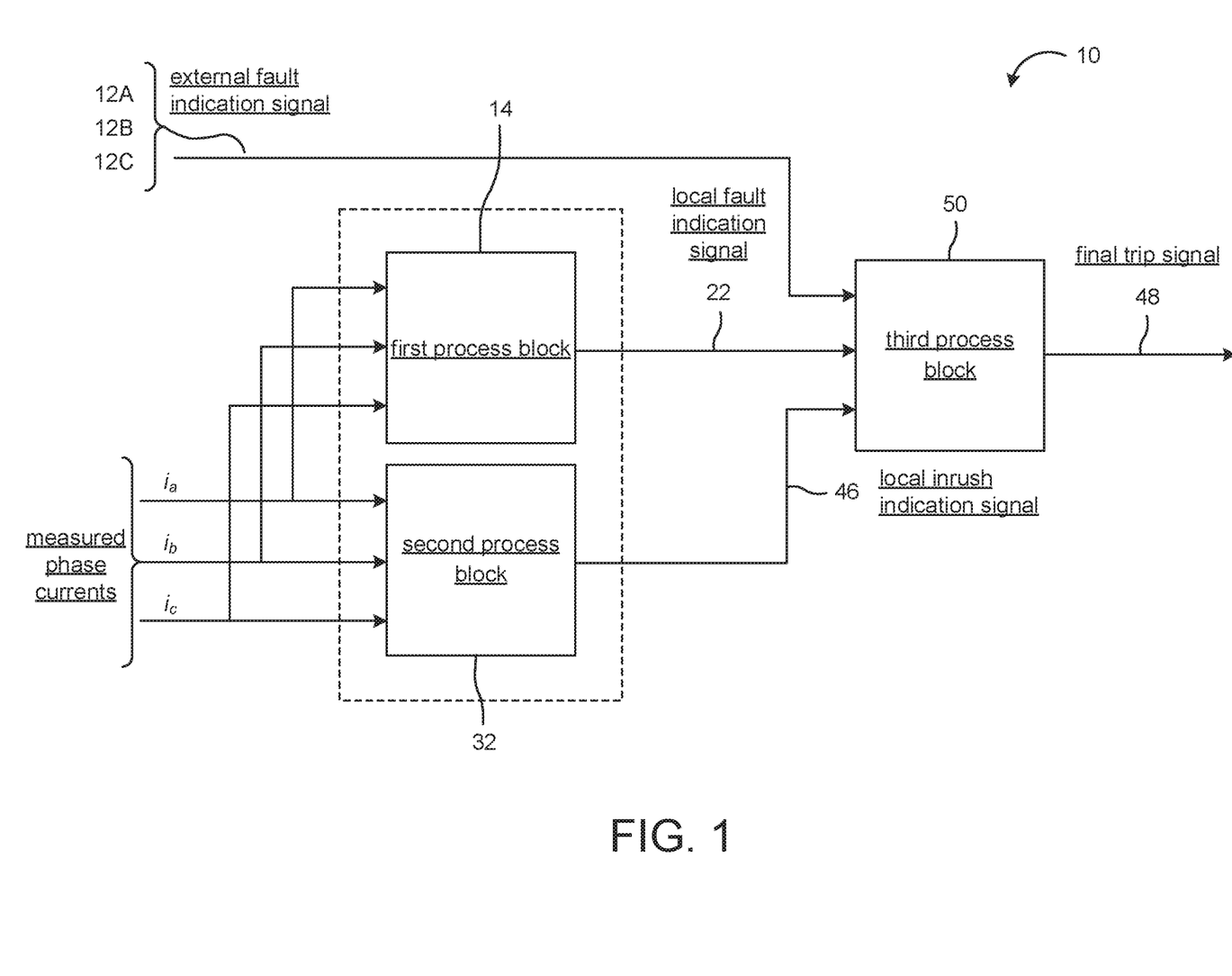
FIG. 1 shows a schematic overview of principle steps in a method of protecting a power transformer.

A schematic overview of the principle steps in a method of protecting a power transformer according to embodiments of the invention is designated generally by reference numeral 10, as shown in FIG. 1.

An embodiment method described is, by way of example, applied to a three phase power transformer having first, second and third phases A, B, C. The method of embodiments of the invention is, however, applicable to power transformers having fewer than or more than three phases.

Returning to an embodiment method illustrated schematically in FIG. 1, the method includes monitoring an external fault indication signal 12A, 12B, 12C. Such a signal may be received from a separate, external protection scheme, e.g. a differential protection scheme, which may be monitoring the electrical power network in which the power transformer being protected is located. Each signal 12A, 12B, 12C is indicative, respectively, of the external protection scheme having determined the occurrence of a fault, e.g. a short-circuit, in relation to the corresponding phase A, B C.

The first embodiment method also includes carrying out locally a fault determination, as represented schematically in FIG. 1 by a first process block 14. Within the context of embodiments of the invention, carrying out the fault determination locally is intended to mean that such fault determination is carried out specifically for the purposes of implementing embodiments of the invention, e.g. by a control unit arranged at or adjacent to the power transformer being protected and programmed to implement the method of embodiments of the invention. This is in contrast to the aforementioned external fault indication signals 12A, 12B, 12C that are established separately, and probably remotely by a distinct protection scheme.

Carrying out locally a fault determination includes comparing different frequency components of a measured current of the power transformer, and more particularly comparing different frequency components of respective phase currents $i_a$, $i_b$, $i_c$ corresponding to each phase A, B, C of the power transformer.

Figure 2:
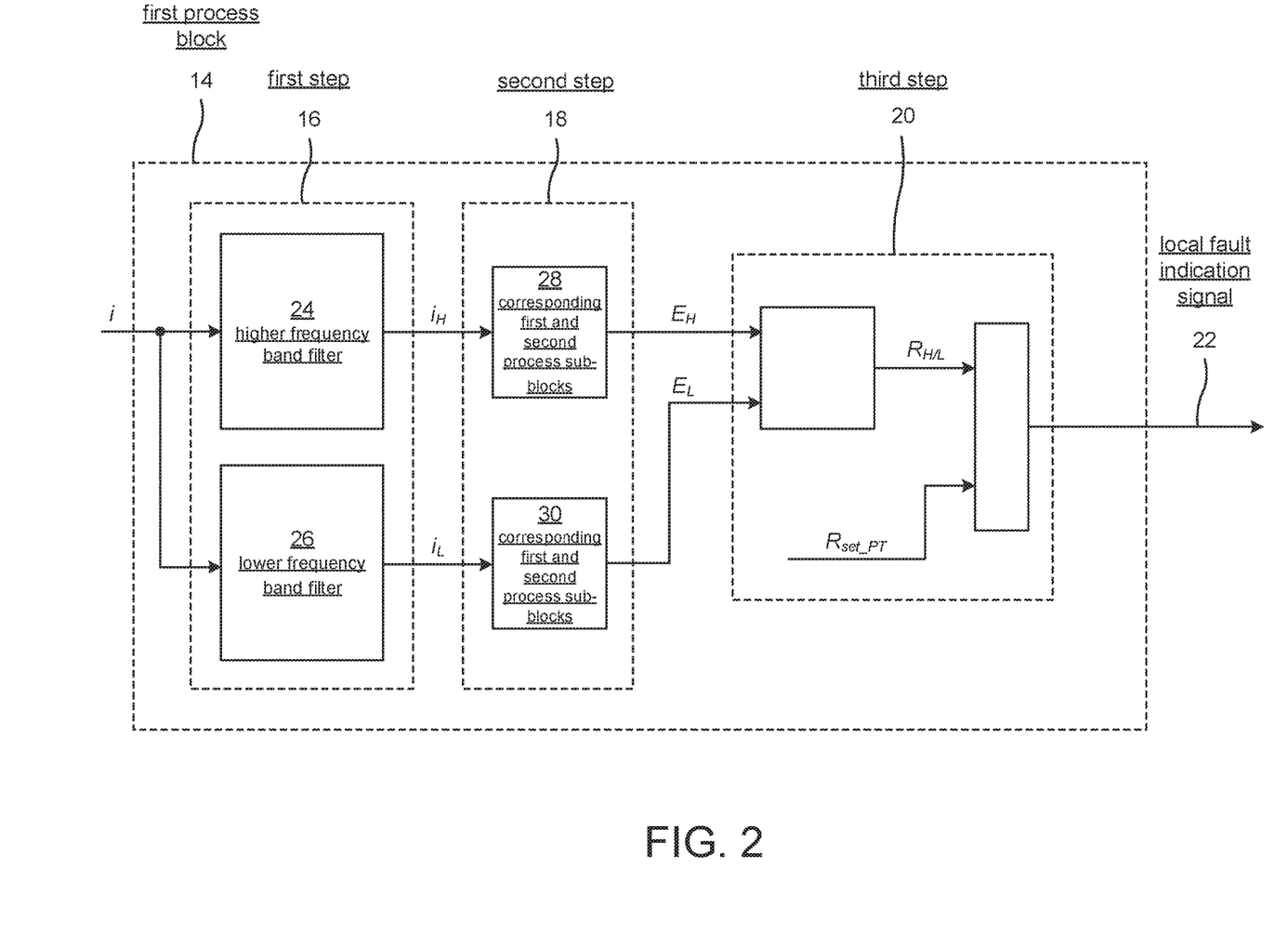
FIG. 2 illustrates schematically the steps involved in carrying out locally a fault determination as part of the method shown in FIG. 1.

Such a comparison of different frequency components of respective phase currents $i_a$, $i_b$, $i_c$ includes, as illustrated schematically in FIG. 2:
- a first step 16 of extracting components $i_H$, $i_L$ of first and second frequency bands of the measured current $i_a$, $i_b$, $i_c$;
- a second step 18 of determining the amplitude $E_H$, $E_L$ of the first and second frequency band components $i_H$, $i_L$;
- a third step 20 of comparing a ratio $R_{H/L}$ of the amplitudes $E_H$, $E_L$ to a fault determination value $R_{set\_FT}$; and thereafter
  confirming a fault has occurred when the ratio $R_{H/L}$ differs from the fault determination value $R_{set\_FT}$, i.e. by outputting a local fault indication signal 22.

More particularly, the first step 16 of extracting first and second frequency band components $i_H$, $i_L$ of the measured current $i_a$, $i_b$, $i_c$ includes passing the measured three phase currents $i_a$, $i_b$, $i_c$ through each of a higher frequency band filter 24 and a lower frequency band filter 26.

In an embodiment method illustrated schematically in FIG. 2, each filter 24, 26 is a wavelet filter bank, although Finite Impulse Response or Infinite Impulse Response filters may also be used.

By way of example, for the wavelet filter banks 24, 26 shown (assuming a sampling frequency of fs):
- the band pass filter coefficients for the higher frequency band filter 24 (e.g. a filter operating over a range of approximately fs/4 to fs/2) are
  [0.0021-0.0604 0.3062-0.6312 0.6313-0.3063 0.0604-0.0021]; while
- the band pass filter coefficients for the lower frequency band filter 26 (e.g. a filter operating over a range of approximately fs/8 to fs/4) are
  [0.0005-0.0151 0.0781-0.2031 0.3891-0.5953 0.7188-0.7188 0.5953-0.3891 0.2031-0.0781 0.0151-0.0005]

The second step 18 of determining the amplitude $E_H$, $E_L$ of the first and second frequency band components $i_H$, $i_L$ involves calculating, within corresponding first and second process sub-blocks 28, 30, a norm value for each of the first and second frequency band components $i_H$, $i_L$. One way in which such respective norm values may be calculated is by way of a Root Mean Square (RMS) calculation, as per the following:

$$E_x(n) = \text{RMS}[x(n)] = \sqrt{\frac{1}{N}\sum_{k=0}^{N-1}|x(n-k)|^2}$$

where,
N is the number of samples of window length for the RMS calculation, with N being chosen to be the number of samples per cycle divided by 4, e.g. if the number of samples per cycle is 48 then N=12.

The third step 20 of comparing a ratio $R_{H/L}$ of the amplitudes $E_H$, $E_L$ to a fault determination value $R_{set\_FT}$ and thereafter confirming a fault has occurred when the ratio $R_{H/L}$ differs from the fault determination value $R_{set\_FT}$ is carried out according to the following $$R_{H/L} = \frac{E_H}{E_L} = \frac{\text{RMS}(i_H)}{\text{RMS}(i_L)} > R_{set\_FT}$$

where,
$R_{set\_FT}$ is a predetermined value which, by way of example, may be 0.2 although in other embodiments of the invention may differ.

Accordingly, it follows that a local fault indication signal 22 is output, i.e. to confirm that a fault has occurred, if the ratio $R_{H/L}$ of the amplitudes $E_H$, $E_L$ is greater than the fault determination value $R_{set\_FT}$.

An embodiment method of the invention illustrated schematically in FIG. 1, the method further includes carrying out locally an inrush current determination, as represented schematically by a second process block 32.

Again, within the context of embodiments of the invention, carrying out the inrush current determination locally is intended to mean that such inrush current determination is carried out specifically for the purposes of implementing embodiments of the invention, e.g. by a control unit arranged at or adjacent to the power transformer being protected and programmed to implement the method of embodiments of the invention.

Figure 3:
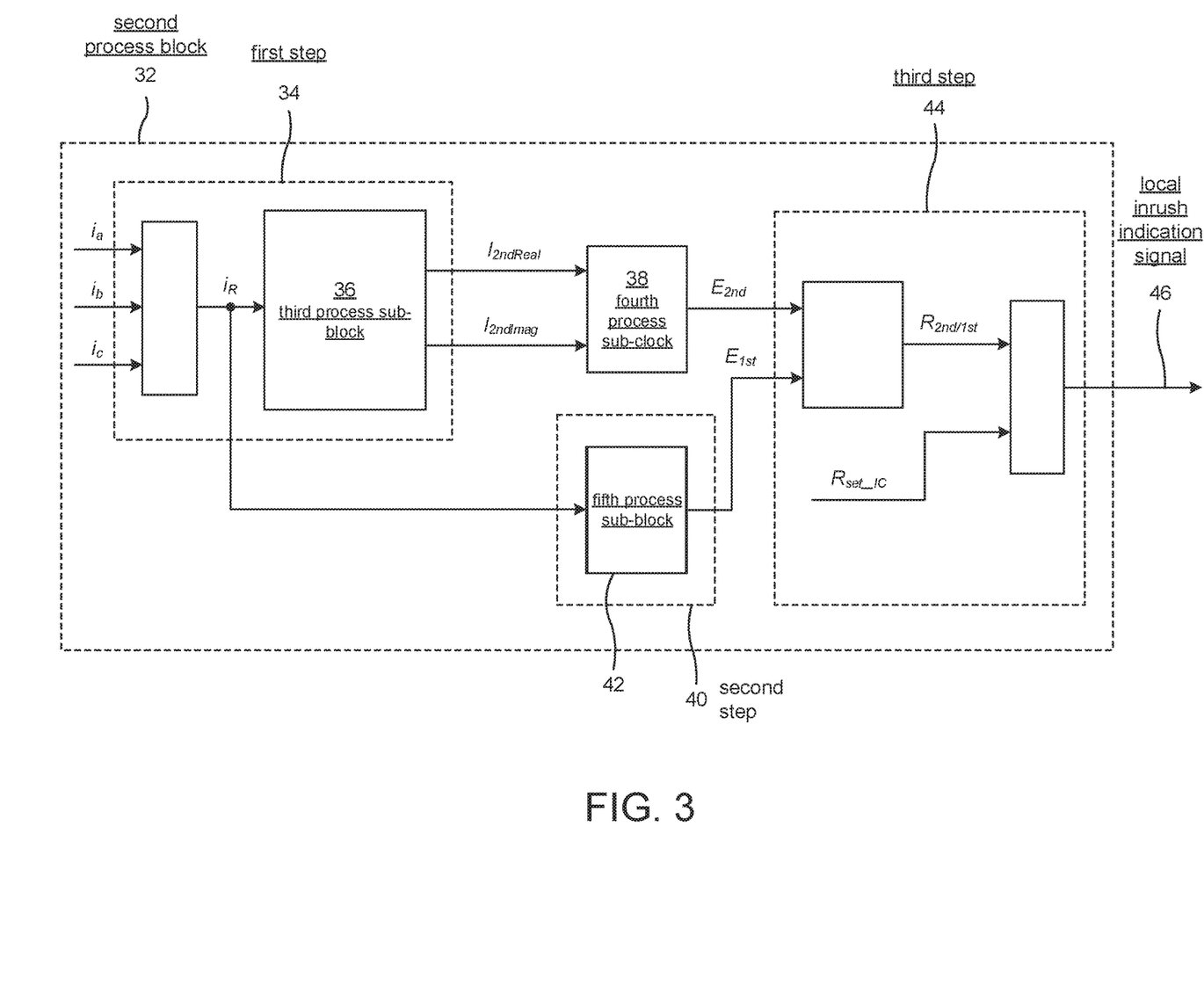
FIG. 3 illustrates schematically the steps involved in carrying out locally an inrush current determination as part of the method shown in FIG. 1.

The steps involved in carrying out locally an inrush current determination are illustrated schematically in FIG. 3.

Such an inrush current determination includes comparing a harmonic component of the power transformer with a fundamental current of the power transformer, and more particularly includes comparing a ratio $R_{2nd/1st}$ of the magnitude of a $2^{nd}$ harmonic frequency component $E_{2nd}$ and the magnitude of a fundamental frequency component $E_{1st}$ with an inrush current determination value $R_{set\_IC}$.

As shown in FIG. 3, the magnitude of the $2^{nd}$ harmonic frequency component $E_{2nd}$ is determined by a first step 34 of summing the three measured phase currents $i_a$, $i_b$, $i_c$ together to obtain a residual current $i_R$ according to $$i_R = i_a + i_b + i_c$$

The the magnitude of the $2^{nd}$ harmonic frequency component $E_{2nd}$ is then obtained first by convolution (within a third process sub-block 36) of the residual current $i_R$ with a series of complex coefficients to produce a complex number, denoted as $I_{2ndReal}$ and $I_{2ndImag}$, and then by utilising (within a fourth process sub-clock 38) an RMS calculation according to $$E_{2nd}(n) = \sqrt{I_{2ndReal}^2(n) + I_{2ndImag}^2(n)}$$

The complex coefficients used for the aforementioned convolution are obtained as follows.

A parameter matrix A is predetermined with reference to Euler's equation, and based on a chosen sampling regime used to measure the phase currents $i_a$, $i_b$, $i_c$ of the power transformer, i.e. according to the following:

$$A = \begin{bmatrix} 1 & 1 & 1 & 1 & 1 \\ e^{j\omega_0 T_s} & e^{-j\omega_0 T_s} & e^{j2\omega_0 T_s} & e^{-j2\omega_0 T_s} & e^{-T_s} \\ \vdots & \vdots & \vdots & \vdots & \vdots \\ e^{j\omega_0 N_s T_s} & e^{-j\omega_0 N_s T_s} & e^{j2\omega_0 N_s T_s} & e^{-j2\omega_0 N_s T_s} & e^{-N_s T_s} \end{bmatrix}$$

where,
$\omega_0$ is fundamental frequency in radians and is given by $2\pi f_0$;
$T_s$ is the sampling period; and
$N_s$ is number of samples for the chosen window length.

A least square matrix P is then calculated by the following formula:

$$P = (A^T A)^{-1} A^T$$

Thereafter, the third row of the least square matrix P provides the complex coefficients for extracting the $2^{nd}$ harmonic frequency component $I_{2ndReal}$, $I_{2ndImag}$ by way of the convolution mentioned above.

For example, if the fundamental frequency $f_0$ of the system is 50 Hz, the sampling frequency is 2400 Hz, and the window length is selected as 24 samples, then the complex coefficients are:

[−0.2708−0.0740i, −0.0702−0.0596i, 0.0687-0.0389i, 0.1493-0.0149i, 0.1780+0.0097i, 0.1644+0.0320i, 0.1198+0.0498i, 0.0565+0.0612i, −0.0130+0.0651i, −0.0774+0.0611i, −0.1271+0.04954i, −0.1554+0.0317i; −0.1583+0.0093i; −0.1357-0.01523i; −0.0907-0.0391i; −0.0295-0.0596i; 0.0387-0.0736i; 0.1028-0.0788i; 0.1506-0.0731i; 0.1696-0.0551i; 0.1482-0.0240i; 0.0766+0.0199i; −0.0524+0.0754i; −0.2428+0.1407i]

The magnitude of the fundamental frequency component $E_{1st}$ is obtained from the residual current $i_R$ in a second step 40 within a fifth process sub-block 42 by using a half-cycle Fourier method according to:

$$E_{1st} = \text{RMS}[i_R(n)] = \frac{\pi f_0}{\sqrt{2}} \sum_{k=0}^{N/2-1} |i_R(n-k)|$$

where,
N is the time window of a half-cycle of the fundamental frequency, such that if the sampling frequency is 2400 Hz then N=24.

Thereafter the ratio $R_{2nd/1st}$ of the magnitude of the $2^{nd}$ harmonic frequency component $E_{2nd}$ and the magnitude of the fundamental frequency component $E_{1st}$ is compared with an inrush current determination value $R_{set\_IC}$ in a third step 44, i.e. according to $$R_{2nd/1st}(n) = \frac{E_{2nd}(n)}{E_{1st}(n)}$$

and the discriminative criterion for identifying the presence of an inrush current, i.e. when the ratio $R_{2nd/1st}$ differs from the inrush current determination value $R_{set\_IC}$, is given by $$R_{2nd/1st}(n) > R_{set\_IC}$$

where,
$R_{set\_IC}$ is a predetermined value which, by way of example, may be 0.5 although in other embodiments of the invention may differ.

A local inrush indication signal 46 is output to identify the presence of an inrush current when the ratio $R_{2nd/1st}$ of the magnitudes of the $2^{nd}$ harmonic and fundamental frequency components $E_{2nd}$, $E_{1st}$ is greater than the inrush current determination value $R_{set\_IC}$.

Finally, the method of embodiments of the invention includes issuing a final trip signal 48 to protect the power transformer, i.e. to initiate operation of a protection device such as a circuit breaker, if:

(i) an external fault indication signal 12A, 12B, 12C identifies that a fault has occurred and the locally carried out fault determination confirms that a fault has occurred, i.e. if the first process block 14 outputs a local fault indication signal 22; or (ii) an external fault indication signal 12A, 12B, 12C identifies that a fault has occurred and the locally carried out fault determination identifies that no fault has occurred, i.e. no local fault indication signal 22 is output by the first process block 14, but after a predetermined delay the locally carried out inrush current determination confirms the absence of an inrush current.

Figure 4:
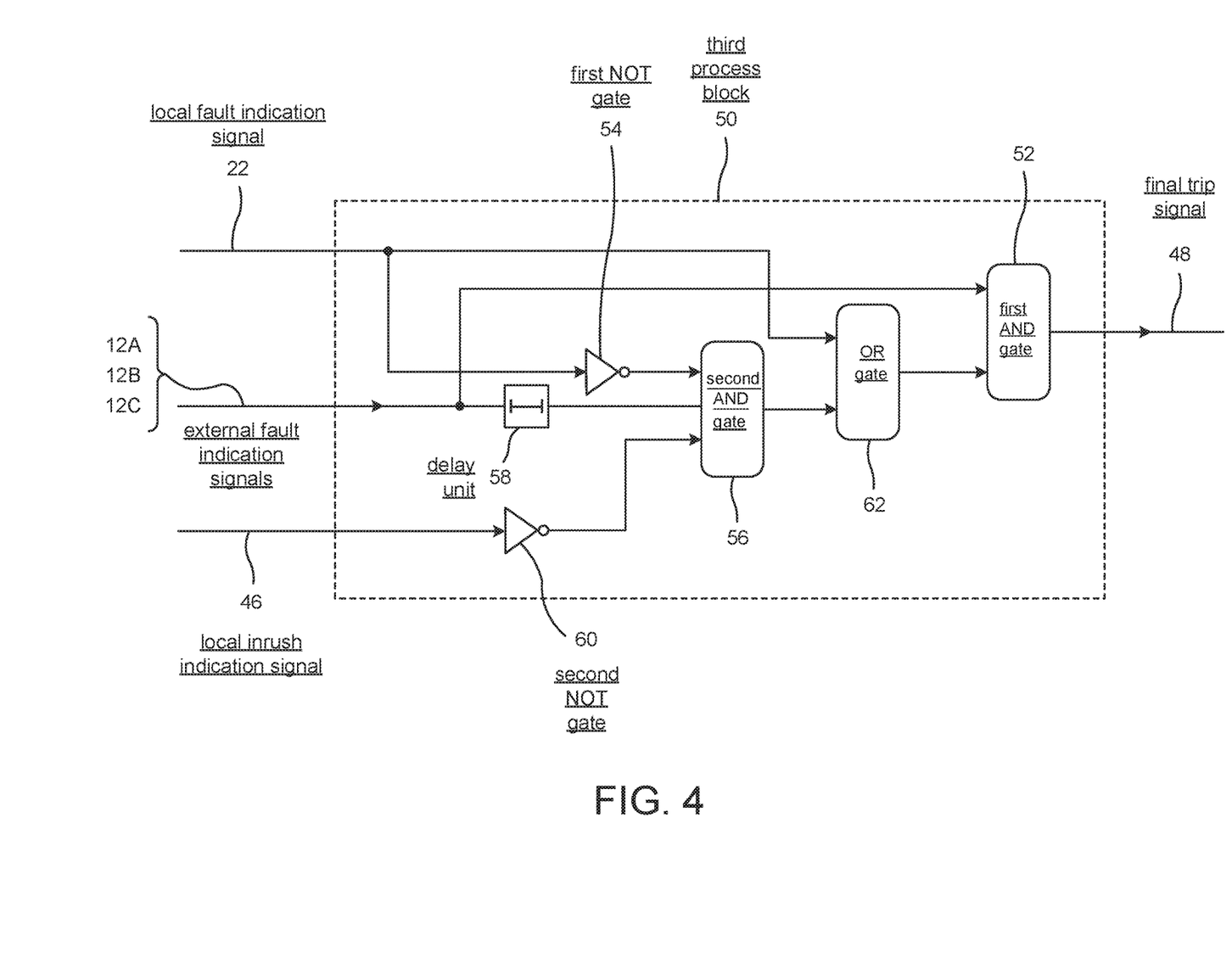
FIG. 4 illustrates schematically example logic applied to determine whether to issue a final trip signal to protect the power transformer.

In the example method embodiment described herein, issuing a final trip signal 48 according to the criteria set out above is implemented within a third process block 50, as shown in FIG. 1, which embodies the logic set out in FIG. 4. Other logic and/or configurations of process block may also be used however.

The third process block 50 and associated logic is able to deal with three possible scenarios:

(i) the occurrence of a conventional fault;
(ii) the occurrence of a particular fault not normally detectable by carrying out locally a fault determination, e.g. a zero-point-on-wave fault; and
(iii) the presence of an inrush current on initial energizing of the power transformer.

In the first scenario, i.e. occurrence of a conventional fault, one or more of the external fault indication signals 12A, 12B, 12C will be received indicating a fault in respect of one or more of the three phases A, B, C of the power transformer.

Similarly, the locally carried out fault determination will identify that a fault has occurred by outputting a local fault indication signal 22.

The or each external fault indication signal 12A, 12B, 12C will pass directly to a first AND gate 52, while the local fault indication signal 22 will arrive at the first AND gate 52 via an OR gate 62. The net result of both such signals 12A, 12B, 12C; 22 reaching the first AND gate 52 is the issuance, without delay, of a final trip signal 48 that will immediately thereafter permit the initiation of a protection device to protect the power transformer.

When a particular fault occurs which the locally carried out fault determination cannot identify, i.e. in scenario (ii), one or more external fault indication signals 12A, 12B, 12C will be received but no local fault indication signal 22 will be output.

The local fault indication signal 22 passes through a first NOT gate 54 before passing to a second AND gate 56, while one or more of the external fault indication signals 12A, 12B, 12C passes, after a predetermined delay (as imposed by a delay unit 58), to the same second AND gate 56.

In the meantime, if the locally carried out inrush current determination confirms the absence of an inrush current, i.e. no local inrush indication signal 46 is output, then such a logic zero after passing through a second NOT gate 60 appears also at the second AND gate 56.

As a consequence all inputs to the second AND gate 56 are high and so it outputs a logic high which passes through the OR gate 62 whereby it combines with one or more of the original external fault indication signals 12A, 12B 12C at the first AND gate 52 to result, after the said predetermined delay, in the issuance of a final trip signal 48 which again initiates protection of the power transformer.

The steps described hereinabove for carrying out locally an inrush current determination are able to be completed very quickly such that the predetermined delay need only be approximately 5 ms. As a result the eventual delay in initiating protection of the power transformer in the event of a particular fault arising, e.g. a zero-point-on-wave fault, is also very small, i.e. approximately only 5 ms.

In scenario (iii), i.e. the presence of an inrush current, a local fault indication signal 22 will not be output because such an inrush current is not a fault, but after passing through the first NOT gate 54 this will appear as a logic high at an input of the second AND gate 56. In addition, one or more external fault indication signals 12A, 12B, 12C will be received because the associated separate, external protection scheme will erroneously identify the inrush current as a fault, also resulting in a further logic high appearing at an input of the second AND gate 56.

However, the locally carried out inrush current determination will meanwhile indicate the presence of an inrush current by outputting a local inrush indication signal 46 which, after passing through the second NOT gate 60 will appear at an input of the second AND gate 56 as a logic zero.

As a consequence of one input to the second AND gate 56 being a logic zero, the second AND gate 56 similarly outputs a logic zero which combines (in the absence of a local fault indication signal 22) with an identical logic zero at the OR gate 62 whereby a logic zero is also passed to the first AND gate 52 to prevent, irrespective of the input also at the first AND gate 52 of one or more erroneous external fault indication signals 12A, 12B, 12C, the issuance of a final trip signal 48. In this manner the mal-operation of a protection device to erroneously protect the power transformer is avoided.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of protecting a power transformer, the method comprising:
    monitoring an external fault indication signal;
    carrying out locally a fault determination by directly identifying a characteristic of a fault;
    carrying out, based on the external fault indication signal indicating a fault has occurred and a failure of the fault determination to confirm a fault, locally an inrush current determination; and
    issuing a final trip signal to protect the power transformer if:
        the external fault indication signal identifies that a fault has occurred and the locally carried out fault determination identifies that no fault has occurred but after a predetermined delay the locally carried out inrush current determination confirms the absence of an inrush current.

2. The method of protecting a power transformer according to claim 1, wherein carrying out locally a fault determination includes comparing two non-fundamental different frequency bands of a measured current of the power transformer.

3. The method of protecting a power transformer according to claim 2, wherein comparing different frequency components of a measured current of the power transformer includes:
    extracting components of first and second frequency bands of the measured current;
    determining an amplitude of the first and second frequency band components;
    comparing a ratio of the amplitudes to a fault determination value; and
    confirming a fault has occurred when the ratio differs from the fault determination value.

4. The method of protecting a power transformer according to claim 1, wherein carrying out locally an inrush current determination includes comparing a harmonic current of the power transformer with a fundamental current of the power transformer.

5. The method of protecting a power transformer according to claim 4, wherein comparing a harmonic current of the power transformer with a fundamental current of the power transformer includes:
    obtaining a 2nd harmonic frequency component and a fundamental frequency component of a measured current of the power transformer;
    determining a magnitude of the 2nd harmonic and a magnitude of a fundamental frequency;
    comparing a ratio of the magnitude of the 2nd harmonic and the magnitude of a fundamental frequency to a inrush current determination value; and identifying a presence of an inrush current when the ratio differs from the inrush current determination value.

6. The method of protecting a power transformer according to claim 5, wherein obtaining a 2nd harmonic frequency component of a measured current of the power transformer and determining the magnitude of the 2nd harmonic frequency component includes a convolution of the measured current with complex coefficients, wherein the complex coefficients are established by a predetermined parameter matrix based on a sampling regime used to measure the current of the power transformer.

7. The method of protecting a power transformer according to claim 5, wherein the magnitude of the fundamental frequency component is determined using a half-cycle Fourier method.

* * * * *